UNITED STATES PATENT OFFICE.

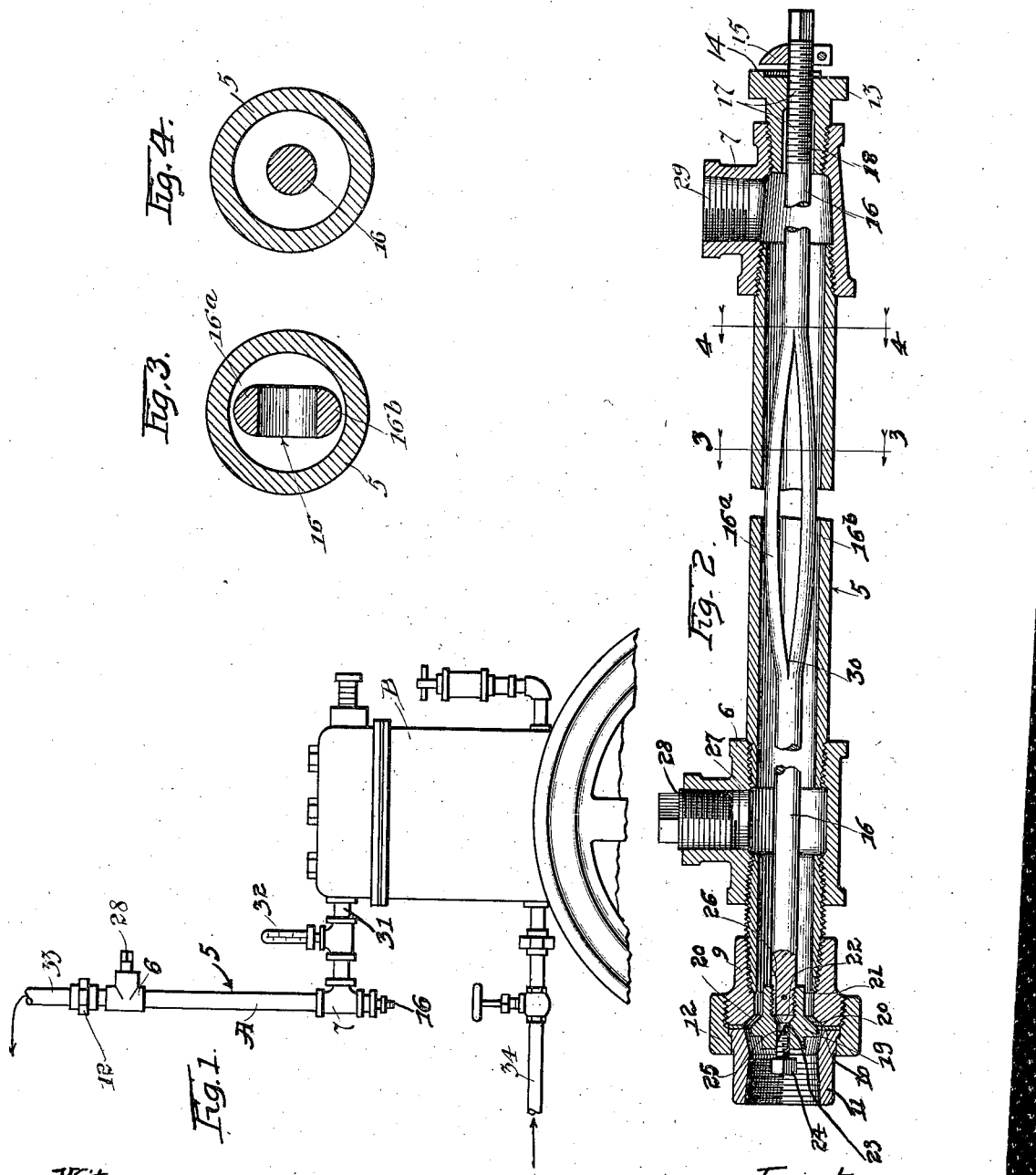

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS.

EXPANSION-VALVE.

1,185,689.  Specification of Letters Patent.  Patented June 6, 1916.

Application filed May 25, 1912. Serial No. 699,696.

*To all whom it may concern:*

Be it known that I, JOHN M. LARSON, a citizen of the United States, residing at Chicago, in the county of Cook and State of Illinois, have invented new and useful Improvements in Expansion-Valves, of which the following is a full, clear, concise, and exact description, reference being had to the accompanying drawing, forming a part of this specification.

My invention relates to improvements in expansion valves and has for its object the production of a valve that can be adapted for use with either air, gas or water and in connection with various industries.

A further object is the production of a device in which the expansible member is so formed as to operate efficiently in either direction after the valve is closed without deterioration or injury.

A further object is the production of a device of simple construction, which can be cheaply manufactured and not liable to get out of order.

These and such other objects as may hereinafter appear are attained by my device, an embodiment of which is illustrated in the accompanying drawings, in which—

Figure 1 represents a plan view of my device installed in connection with a gas engine; Fig. 2 represents a longitudinal view of my device partly in section; Fig. 3 represents a sectional view on the line 3—3 of Fig. 2, looking in the direction indicated by the arrows; and Fig. 4 represents a sectional view on the line 4—4 of Fig. 2, looking in the direction indicated by the arrows.

Like numerals of reference indicate like parts in the several figures of the drawing.

Referring now to the drawings, 5 represents the outer cylindrical shell of the device on the ends of which are threaded T's 6 and 7. An ordinary threaded extension is screwed in the outer end of the T 6 on which is screwed the head piece 9. An ordinary gasket 10 is placed between the head piece 9 and the flanged tail piece 11 and an ordinary union 12 is screwed on the head 9, holding the members together. Screwed into the opposite end of the T 7 is a flanged head 13 having a dial 14 on its outer face over which moves an indicator 15 screwed on the end of the expansible rod 16, the end of this rod being screwthreaded at its end 17 and passing through the central opening 18 in the head. On the opposite end of the rod 16 is screwed a valve 19, the tapering seats 20 of which are adapted to press against the valve seat 21 on the inner face of the head piece 9. The opening 22 in the valve into which the rod 16 screws extends clear through the valve but is restricted, as shown at 23, and a restriction screw 24 is screwed therein. This screw, at some point, is filed flat, slantingwise from a point close to the head extending to the end, as shown at 25, forming a passage that communicates with the restricted opening at the end of the screw, and the end of the rod 16 where it enters the valve, is also filed away on one side, as shown at 26, forming a corresponding passage or channel communicating with the opening 22 at the rear of the rod and forming with the passage through the restricted opening a small channel to permit leakage and insure circulation. The T 6 is provided with an opening 27 in which is fitted a screw plug 28 and the T 7 is also provided with a port or opening 29 through which fluid may be admitted into the valve.

The rod 16 is made preferably of some resilient expansible metal and in order to take care of additional contraction after the valve is closed, one or more slits 30 are made in the rod, preferably through the center and the members 16$^a$, 16$^b$ are spread apart at the center of the slit, as shown clearly in Fig. 2, thus forming in effect a spring member which will spread apart and draw together as the rod contracts and expands after the valve is closed.

In Fig. 1 I have shown my expansible valve A in place on the water jacket of a gas engine B, the water outlet of the jacket being screwed into the port or opening 29 in the T 7. A thermometer or temperature registering device 32 is provided in the pipe 31 between the jacket and the expansion valve. A waste pipe 33 is screwed into the end of the tail piece of the union or end of the valve. The water for the jacket is brought in through the water inlet 34. When this device is mounted in place, as shown in Fig. 1, the adjustment screw or indicator 15 is set to regulate the temperature of the outlet water. As the main purpose of the water jacket is that of cooling, it is essential that hot water be removed from the jacket and cooler water be substituted in its place. At the same time it is highly advantageous that the hot water be utilized and that no excess water be thrown off where it may be wasted unless the temperature of the water in the jacket is too high to perform its cooling function.

In the use of my device the adjustment screw being set for a certain temperature so long as the water within the jacket remains sufficiently cool to perform its purpose, the valve 19 remains closed. As soon, however, as the temperature of the water within the jacket rises above the required temperature the rod 16 expands, opening the valve and permitting the water to pass off through the waste or to be collected and used for other purposes, the place of the water withdrawn from the jacket being taken by water admitted through the water inlet 34.

The splitting of the rod does not in any sense impair its efficiency in that it does not permit the ready opening of the valve, while at the same time, when the valve is closed and the temperature of the water within the tube becomes cold, the extra contraction after the valve has reached its seat simply results in bringing together the split members 16ª, 16ᵇ, and does not bend or deform the rod as a whole. In ordinary cases the deforming of the rod often results in unseating the valve to a greater or less extent and rendering the device inefficient as well as often permanently impairing the efficiency of the device, the deformed rod failing to return to its original condition and position. In my illustration I have shown the rod as split in one place. I often find that I attain more uniform results by putting two or more slits in the rod as the contraction of the metal is often better taken care of by the use of several split portions.

In the drawing it is clearly shown that with the valve open, the members 16ª and 16ᵇ are distended and that the contraction closing the valve brings the members toward each other but does not entirely close the opening therebetween, thus leaving an opportunity for taking care of the extra contraction described in the preceding paragraph; the split rod serving as a compensator and preventing deformation.

A device of this character is very useful in a great number of cases. For instance, in the use of an ammonia or carbonic gas condensing coil it is very essential that the water while in use is of proper temperature to keep the coils cool. The expansion valve can be set so as to close the waste, and on the other hand, when there is no water in use and the water becomes warm, the expansion valve will then open and allow the water to run to the waste. This type of valve is also of great value in steam and electric air compressors, electric transformers, and machines of this kind.

While I have shown a specific embodiment of my device and shown it with the valve closing inwardly, it is to be understood that I do not limit myself to this precise construction, as the valve can be used either inwardly or outwardly opening and used in connection with hot or cold liquid, and can be split or distended at a plurality of points throughout its length.

A further use to which my device may be put is in connection with hot water systems to use in heating residences and offices, it being a well known fact that often during the night the water gets excessively hot and practically boils in the pipes, causing water-hammer and often damaging the system. In cases of this kind one of my devices could be inserted in the hot water tank and set for a predetermined degree, and when the heated water reaches said predetermined temperature the valve will open, permitting water to flow out through the waste opening into the sink or any place desired, the place of the water removed being of course filled by cold water from the supply. By this use of my device all danger of damage to the system is obviated and a constant temperature maintained.

I have shown in Figs. 1 and 2 a plug 28, closing an outlet just below the waste. This outlet may be very useful if it is desired to use the surplus hot water or water under pressure, as this outlet can be connected to the sink or any place where the water is required and the water used without in any way impairing the efficiency of the system, as the valve will always be in condition to be operated whether the water is being drawn from the outlet or not.

I claim:

1. An expansion valve, comprising a casing, a casing head, an expansible valve stem partly separated by a longitudinal slit one end of which is screwed into said casing head, a valve seat screwed on the opposite end of said casing, a valve mounted on said stem, and means for adjusting the position of said valve.

2. An expansion valve comprising a casing, a casing head, an expansible valve stem partly separated by a longitudinal slit one end of which is screwed into said casing head, a valve seat screwed on the opposite end of said casing, a valve mounted on said stem, and a restriction screw in the base of said valve, said stem and valve being provided with a passage from the interior of the casing to the atmosphere.

3. An expansion valve, comprising a casing, a casing head, an expansible valve stem partly separated by a longitudinal slit, one end of which is screwed into said casing head, a valve seat screwed on the opposite end of said casing, a valve mounted on said stem, a restriction screw in the base of said valve, said stem and valve being provided with a passage from the interior of the casing to the atmosphere, and means for varying the area of said passage.

4. An expansion valve, comprising a casing, a casing head, an expansible valve stem partly separated by a longitudinal slit, one end of said stem being screwed into said casing head, a valve seat screwed on the opposite end of said casing, a valve mounted on said stem, and means for adjusting the position of said valve.

5. An expansion valve, comprising a casing, a casing head, an expansible valve stem partly separated by a longitudinal slit, one end of said stem being screwed into said casing head, a valve seat screwed on the opposite end of said casing, an inwardly seating valve mounted on said stem, and a restriction screw in the base of said valve, said stem and valve being provided with a passage from the interior of the casing to the atmosphere.

6. An expansion valve, comprising a casing, a casing head, an expansible valve stem partly separated by a longitudinal slit, one end of said stem being screwed into said casing head, a valve seat screwed on the opposite end of said casing, an inwardly seating valve mounted on said stem, a restriction screw in the base of said valve, said stem and valve being provided with a passage from the interior of the casing to the atmosphere, and means for varying the area of said passage.

7. An expansion valve, comprising a casing, a casing head, an expansible valve stem split intermediate of its ends, one end of said stem being screwed into said casing head, a valve seat screwed on the opposite end of said casing, an inwardly seating valve mounted on said stem, and means for adjusting the position of said valve.

8. An expansion valve, comprising a casing, a casing head, an expansible valve stem split intermediate of its ends, one end of said stem being screwed into said casing head, a valve seat screwed on the opposite end of said casing, an inwardly seating valve mounted on said stem, and a restriction screw in the base of said valve, said stem and valve being provided with a passage from the interior of the casing to the atmosphere.

9. An expansion valve, comprising a casing, a casing head, an expansible valve stem split intermediate of its ends, one end of said stem being screwed into said casing head, a valve seat screwed on the opposite end of said casing, an inwardly seating valve mounted on said stem, a restriction screw in the base of said valve, said stem and valve being provided with a passage from the interior of the casing to the atmosphere, and means for varying the area of said passage.

10. An expansion valve, comprising a casing, a casing head, an expansible valve stem one end of which is screwed into said casing head, said stem being split lengthwise and distended at various points throughout its length, a valve seat screwed on the opposite end of said casing, an inwardly seating valve mounted on said stem, and means for adjusting the position of said valve.

11. An expansion valve, comprising a casing, a casing head, an expansible valve stem partly separated by a longitudinal slit one end of which is screwed into said casing head, a valve seat screwed on the opposite end of said casing, a valve mounted on said stem, and a restriction screw in the base of said valve, said stem and valve being provided with a passage from the interior of the casing to the atmosphere.

12. An expansion valve, comprising a casing, a casing head, an expansible valve stem partly separated by a longitudinal slit, one end of said stem being screwed into said casing head, a valve seat screwed on the opposite end of said casing, a valve mounted on said stem, and means for adjusting the position of said valve.

13. An expansion valve, comprising a casing, a casing head, an expansible valve stem split intermediate of its ends, one end of said stem being screwed into said casing head, a valve seat screwed on the opposite end of said casing, a valve mounted on said stem, and means for adjusting the position of said valve.

14. An expansion valve, comprising a casing, a casing head, an expansible valve stem one end of which is screwed into said casing head, said stem being split lengthwise and distended at various points throughout its length, a valve seat screwed on the opposite end of said casing, a valve mounted on said stem, and means for adjusting the position of said valve.

15. An expansion valve, comprising a casing, a casing head, a valve and an expansible valve stem extending in the direction of movement of the valve and having a portion separated for yielding laterally, the parts thereof being so disposed as to be distended laterally under varying degrees of temperature.

In witness whereof, I have hereunto subscribed my name in the presence of two witnesses.

JOHN M. LARSON.

Witnesses:
 E. R. KING,
 C. E. KANE.